US008894966B2

(12) United States Patent
Yang et al.

(10) Patent No.: US 8,894,966 B2
(45) Date of Patent: Nov. 25, 2014

(54) PASSIVE SPIRAL MICROMIXER AND ITS APPLICATIONS

(71) Applicants: Institute of Process Engineering, Chinese Academy of Sciences, Beijing (CN); Nanjing Jiuzhang Chemical Technology Co., Ltd, Nanjing, Jiangsu (CN)

(72) Inventors: Chao Yang, Beijing (CN); Xi Wang, Beijing (CN); Yumei Yong, Beijing (CN); Guangji Zhang, Beijing (CN); Jingcai Cheng, Beijing (CN); Xin Feng, Beijing (CN); Xiangyang Li, Beijing (CN); Weipeng Zhang, Beijing (CN); Yuanyuan Li, Beijing (CN); Zaisha Mao, Beijing (CN)

(73) Assignees: Institute of Process Engineering, Chinese Academy of Sciences, Beijing (CN); Nanjing Ziuzhang Chemical Technology Co., Ltd, Nanjing, Jiangsu (CN)

( * ) Notice: Subject to any disclaimer, the term of this patent is extended or adjusted under 35 U.S.C. 154(b) by 0 days.

(21) Appl. No.: 14/068,804

(22) Filed: Oct. 31, 2013

(65) Prior Publication Data
US 2014/0120031 A1  May 1, 2014

(30) Foreign Application Priority Data

Oct. 31, 2012  (CN) .......................... 2012 1 0430103

(51) Int. Cl.
*C01F 11/46* (2006.01)
*B01F 13/00* (2006.01)

(52) U.S. Cl.
CPC ........... *B01F 13/0096* (2013.01); *C01F 11/462* (2013.01); *Y10S 977/773* (2013.01)
USPC ..... 423/554; 366/131; 366/150.1; 366/165.1; 366/341; 366/339; 977/773

(58) Field of Classification Search
USPC ............ 423/554; 366/131, 150.1, 165.1, 341, 366/339; 977/773
See application file for complete search history.

(56) References Cited

U.S. PATENT DOCUMENTS 2,358,050 A * 9/1944 Boulet ......................... 423/554
2,685,499 A * 8/1954 Hood .......................... 423/554

(Continued)

FOREIGN PATENT DOCUMENTS

CN      1835789 A    9/2006
CN    101234324 A    8/2008

(Continued)

OTHER PUBLICATIONS

Office Action, issued Jun. 17, 2014, in connection with Chinese Patent Application No. 201210430103.2.

*Primary Examiner* — Timothy Vanoy
(74) *Attorney, Agent, or Firm* — Pearl Cohen Zedek Latzer Baratz LLP

(57) ABSTRACT

A micro-mixer and use thereof for synthesis of barium sulfate particles is disclosed. The micro-mixer includes feeding tubes, reservoirs, a mixing channel, a buffer reservoir and a sampling tube. The mixing channel is made of hydrophobic materials and processed into a spiral structure, in which baffles are set in interval arrangement at both sides of the channel wall. The types of the baffles include leaning-forward baffles, vertical baffles and leaning-backward baffles. Setting the baffles helps produce local secondary flow in the mixer, which enhances fluids mixing process. The micro-mixer is suitable to rapid reactions or precipitation processes, whose reaction time is much less than mixing time, and has broad application prospects in many fields involving mixing reaction such as pharmaceutical and chemistry industry.

9 Claims, 1 Drawing Sheet

(56) References Cited

U.S. PATENT DOCUMENTS

2004/0197262 A1* 10/2004 Hardinghaus et al. ........ 423/554
2010/0022680 A1* 1/2010 Karnik et al. ................. 523/105
2011/0128814 A1* 6/2011 Hanada ........................ 366/339

FOREIGN PATENT DOCUMENTS

| | | |
|---|---|---|
| CN | 101450300 | 6/2009 |
| CN | 202199279 U | 4/2012 |
| WO | WO 2004/108261 | 12/2004 |

* cited by examiner

PASSIVE SPIRAL MICROMIXER AND ITS APPLICATIONS

This U.S. patent application claims priority of Chinese Patent Application No. 201210430103.2, filed on Oct. 31, 2012, which is hereby incorporated by reference in its entirety.

FIELD OF THE INVENTION

The invention relates to a spiral micro-mixer with built-in baffles, more specifically a high-performance mixing and reaction equipment particularly suitable to rapid reactions or mixing processes between fluids in pharmaceutical, energy and chemical industries—a passive spiral micromixer and its applications.

BACKGROUND OF THE INVENTION

Mixing refers to a unit operation which makes two or more materials achieve a certain uniformity of dispersion by mechanical means or fluid flow. The mixing process is often associated with reduction and expansion of fluid volume, as well as mass transfer between different fluids. Mixing processes include macro-mixing, meso-mixing and micro-mixing, which are on different scales, respectively. Macro-mixing considers the dispersion, recycle and mixing processes at scales up to the size of the apparatus, meso-mixing considers the rate of dispersion from feeding site to main part of the reactor while micro-mixing is associated specifically with small scales down to the molecular level. Rapid and complex reactions are often encountered in process industries such as the field of chemical engineering, pharmaceutical and energy. The yield and quality of the product in rapid reactions is much more dependent on the mixing performance of the multi-phase reagents. So it is significant to develop novel high-performance mixer.

Over the past years, as micromachining technology is increasingly perfecting, we have certain knowledge on micro- and meso-physical phenomenon and use it in production and life. In micro-fluidic systems, influence of surface force and viscous force is dominant while inertia force is weakened since the ratio of surface area to volume increases rapidly; moreover, the rate of flow is usually small and belongs to laminar with small Reynolds number. Under the condition of laminar flow, mixing intensification can be realized by means of enlarging the interface between different phases by lengthening or shearing the laminar flow or significantly reducing the thickness of fluids by diverting, i.e. splitting liquid flow into smaller liquid flows, which can be achieved by creating relative motion between the liquid flows or changing the configuration of the flow channel. Currently, the more common method is designing more complex sequential or parallel flow path system according to micro fluid mechanics, to improve the mixing efficiency and reduce the mixing time and space required. In general, micro-mixers can be classified as either active or passive ones. Active mixing means the methods needing for external energy induced mixing, including micro stiffing, pressure disturbance, acoustic perturbation, electric driving, magnetic driving, thermal driving and so on. Passive micro-mixers do not require any external energy source, and they rely mostly on diffusion or chaotic advection using particular channel geometry that creates vortex flow. Chinese Patent Application No. CN101234324 presented a sequential passive multi-layer micro-contactor. The mixing section of the contactor is composed of parallel micro channels. Chinese Patent Application No. CN101234324 proposed a serpentine capillary heating tube with constant temperature heating device. Complex geometry is designed to enhance the convection effect of the fluids in the passive micro-mixers. However, as the fluids flow, the light phase and heavy phase gradually separate from each other as a result of the centrifugal force in the serpentine tube, which is the disadvantage of the mixing performance.

SUMMARY OF THE INVENTION

The present invention relates to a passive spiral micromixer with baffles comprising at least two inlet fluid reservoirs, at least two inlet channels, a spiral mixing channel, baffles and a buffer reservoir; wherein the inlet fluid reservoir is connected with a feeding tube on one end and an inlet channel on another end, and the other end of the inlet channel is connected with the spiral mixing channel; the inlet angle at the intersection between two inlet channels is a, which interchange at the spiral mixing channel; the baffles are set in interval arrangement at both sides of the spiral mixing channel wall, and they are arranged more intensively at entrance section than those at fully developed section; the angle between the baffle and the spiral mixing channel wall is β; the outlet end of the spiral mixing channel is connected with the buffer reservoir, and the sample in the buffer reservoir is collected through an outlet tube.

The invention also relates to a method of synthesis of barium sulfate particles in the spiral micro-mixer according to Claim 1 comprises: $Na_2SO_4$ and $BaCl_2$ solutions at identical concentration ranging from 1 mol/L to 2.5 mol/L are fed into the micro-mixer at the same volumetric flow rate which ranges from 1 mL/min to 5 mL/min and mixed; the mixture collected from the outlet of the micro-mixer is firstly washed using ethanol and then dried at 100° C. for 24 hours, and give barium sulfate particles with $d_{43}$ ranging from 100 nm to 500 nm.

BRIEF DESCRIPTION OF THE DRAWINGS

As shown in FIG. 1, B1 and B2 are inlet fluid reservoirs, C1 and C2 are inlet channel, D is a spiral fluid mixing channel, E are baffles and F is a buffer reservoir; α is the angle formed between the inlet channels C1 and C2. As shown in FIG. 1, β is the angle formed between the baffles and channel wall.

DETAILED DESCRIPTION OF THE INVENTION

Figure 1:
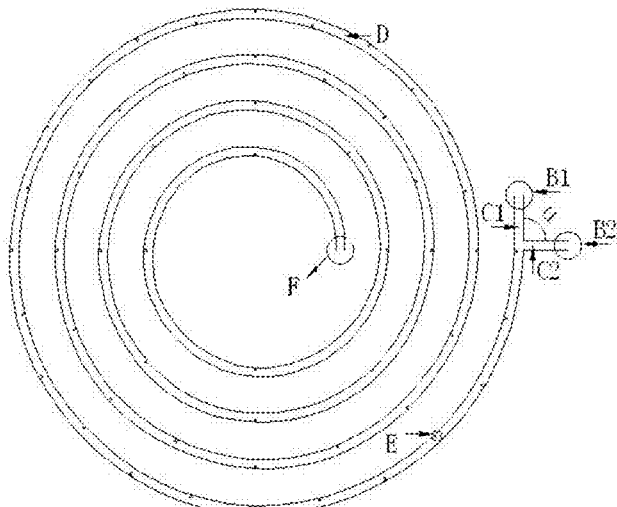
FIG. 1 is a schematic drawing of a spiral micro-mixer according the invention.
Figure 2:
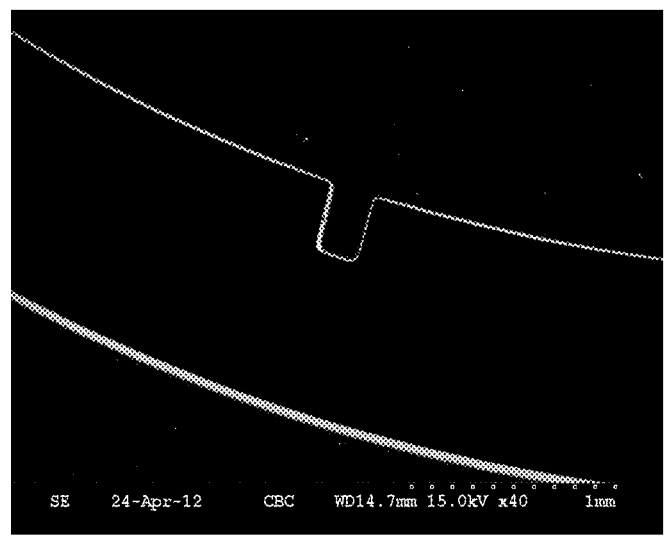
FIG. 2 is a SEM picture of a vertical baffle in the spiral micro-mixer.

The proposed invention solves the problem that mixing efficiency is declined since the light phase and heavy phase gradually separate from each other as a result of the centrifugal force and the heavy phase will flow along the wall, by providing a passive spiral micro-mixer, which improves the adverse effect on mixing of layering induced by the centrifugal force in spiral channel by having baffles built-in and adjusting the inlet angle at the intersection to enhance the fluid mixing.

The invention provide solutions: a passive spiral micromixer with baffles comprising at least two inlet fluid reservoirs, at least two inlet channels, a spiral mixing channel, baffles and a buffer reservoir; The inlet fluid reservoir is connected with a feeding tube on one end and an inlet channel on another end, and the other end of the inlet channel is connected with the spiral mixing channel. The inlet angle at the intersection between two inlet channels is α, which interchange at the spiral mixing channel and α has great influence on the shearing effect at the fluid enters the mixing channel. The baffles are set in interval arrangement at both sides of the spiral mixing channel wall and forms the angle β with the tangent of the intersection of the sides of the spiral mixing channel wall. The spiral mixing channel is connected with one end of the buffer reservoir and mixing fluid in the buffer reservoir pass through another end and is collected through outlet tube. The mixing channel has spiral geometry to introduce centrifugal force for the purpose of improving the mixing.

The work flow of the mixer according to the invention is as follows: the sample to be mixed is delivered to the mixing channel via inlet channel, and then the mixed sample pass through the buffer reservoir and is collected at the outlet.

The presented micro-mixer is made of hydrophobic material such as polydimethylsiloxane or polymethyl methacrylate.

The angle α formed by the two inlet channels ranges from 60° to 300°.

The mixing channel has spiral geometry. The radius of inner circle is 1-3 cm and the radius of outer circle is 6-8 cm. Cylinder number is 3-10. The cross-section of the spiral mixing channel is rectangular, the width of the mixing channel is 0.8-1 mm, and the ratio of width to depth is 1/10.

The baffles are set intensively or loosely. When intensively, the baffles are arranged every 15° of the central angle with the inner circle center as center and the connecting line between the feeding intersection the circle center being the baseline; when loosely, the baffles are arranged every 45° of the central angle, and the changes is in the step of 15° (the arrangement of the baffles is from dense to sparse gradually).

The height of baffles in the micro-mixer is identical with the depth of the mixing channel. The length of the baffles is ⅓-½ of the channel width.

The baffles are leaning-forward when β<90°, leaning-backward when β>90°, and when β=90° vertical baffles are obtained.

The baffles are arranged more intensively at the entrance section and more loosely at the fully developed section.

The baffles are made of hydrophobic material such as polymethyl methacrylate or polydimethylsiloxane.

A method of synthesis of barium sulfate particles in the spiral micro-mixer is presented, which comprises:

$Na_2SO_4$ and $BaCl_2$ solutions at identical concentration ranging from 1 mol/L to 2.5 mol/L are fed into the micro-mixer at the same volumetric flow rate which ranges from 1 mL/min to 5 mL/min and mixed. The mixture collected from the outlet of the micro-mixer is firstly washed using ethanol and then dried at 100° C. for 24 hours, and give barium sulfate particles with $d_{43}$ ranging from 100 nm to 500 nm.

Compared with the existing mixers, the advantageous effects of the presented spiral micro-mixer with baffles lie in:

(1) The invention is directed against the problem that mixing efficiency is declined since the light phase and heavy phase gradually separate from each other as a result of the centrifugal force and the heavy phase will flow along the wall, and set inner components, i.e. the baffles, in the spiral channel and enhance the mixing process by convective mixing and secondary flow.

(2) In the invention, the shearing force at the material contacting each other changes as the angel of inlet changes so that the mixing performances are different. And the mixing performance at the inlet of the mixing channel can be improved by adjusting the inlet angle.

(3) The study suggests that the mixing performance is better in hydrophobic micro-mixers than that in hydrophilic ones. The invention achieved the optimization of the mixing performance in the micro-mixer by choosing channel materials.

(4) The provided invention is suitable for rapid reactions or precipitation processes whose reaction time is much less than mixing time and have broad application prospect in many fields involving mixing reaction such as pharmaceutical and chemistry industry.

EXAMPLE 1-EXAMPLE 6

Examples 1-6 adopt Villermaux-Dushman fast parallel competing reaction as model system to investigate the difference in micro-mixing efficiency at different inlet angles. It is based on a parallel competing reaction system including the following three sections:

The neutralization of diborohydride ions:

$$H_2BO_3^- + H^+ \rightarrow H_3BO_3 \qquad (1)$$

The reaction of iodate and iodide to iodine:

$$5I^- + IO_3^- + 6H^+ \rightarrow 3I_2 + 3H_2O \qquad (2)$$

The iodine produced in reaction (2) further reacts with excess iodide to form tri-iodide according to equilibrium (3):

$$I_2 + I^- \rightarrow I_3^- \qquad (3)$$

Mixing performance of the Villermaux-Dushman system is characterized by the segregation index $X_S$, which is calculated by eqs. (4)-(6) as follows:

$$X_S = \frac{Y}{Y_{ST}} \qquad (4)$$

$$Y = \frac{2([I_2] + [I_3^-])}{[H^+]_0} \qquad (5)$$

$$Y_{ST} = \frac{6[IO_3^-]_0}{6[IO_3^-]_0 + [H_2BO_3^-]_0} \qquad (6)$$

Smaller the segregation index $X_S$ is, the better mixing performance will be. The concentrations of reactants in the Villermaux-Dushman system are listed in Table 1. The flow rates of two liquid phase both are 0.27 mL/min. The $[I_3^-]$ concentrations is determinate by ultraviolet spectrophotometer. The micro-mixing performance of example 1-example 6 are given in Table 2.

TABLE 1

Reactant concentrations

| Reactant | Concentration (mol/L) |
|---|---|
| KI | $1.16 \times 10^{-3}$ |
| $KIO_3$ | $2.23 \times 10^{-3}$ |
| $H_3BO_3$ | $1.818 \times 10^{-2}$ |
| NaOH | $9.09 \times 10^{-2}$ |
| $H_2SO_4$ | 0.024 |

TABLE 2

Micro-mixing performances of different examples

| | Inlet angle (°) | $X_s$ |
|---|---|---|
| Example 1 | 60 | 0.00836 |
| Example 2 | 90 | 0.0081 |
| Example 3 | 150 | 0.00765 |
| Example 4 | 180 | 0.00751 |
| Example 5 | 240 | 0.00508 |
| Example 6 | 300 | 0.00344 |

EXAMPLE 7-8

In order to investigate the effect of surface wettability of the channel wall on the mixing performance, a hydrophilic glass micro-mixer (surface contact angle is 37°) in example 7 and a modified glass micro-mixer (surface contact angle is 94°) in example 8 are used to compare with that in example 2. All the geometry and size of these micro-mixers are identical. The Villermaux-Dushman method is adopted to characterize micro-mixing efficiency. The flow rates of two liquid phase both are 0.27 mL/min, and the results are shown in Table 3. The mixing efficiency in the hydrophobic micro-mixer is higher than those in hydrophilic ones.

TABLE 3

Comparison of micro-mixing efficiency in hydrophobic and hydrophilic micro-mixers

| | Contact angle (°) | $X_s$ |
|---|---|---|
| Example 2 | 130 | 0.0081 |
| Example 7 | 37 | 0.0108 |
| Example 8 | 93 | 0.00874 |

EXAMPLE 9

At room temperature, 2.5 mol/L $Na_2SO_4$ and 2.5 mol/L $BaCl_2$ are fed into the presented spiral micro-mixer with vertical baffles via two inlet tube at the same volumetric flow rate of 5 mL/min, respectively. The sample collected at outlet is dried in oven at 100° C. for 24 hours to give $BaSO_4$ particles with $d_{43}$ of 100 nm.

EXAMPLE 10

At room temperature, 1 mol/L $Na_2SO_4$ and 1 mol/L $BaCl_2$ are fed into the presented spiral micro-mixer with vertical baffles via two inlet tube at the same volumetric flow rate 1 mL/min, respectively. The sample collected at outlet is dried in oven at 100° C. for 24 hours to give $BaSO_4$ particles with $d_{43}$ of 500 nm.

It can be concluded from the above examples that compared with the existing micro-mixers with straight mixing channels, the mixing efficiency in the proposed invention is much better, particularly for synthesis of nano-particles.

What is claimed is:

1. A passive spiral micro-mixer with baffles comprising at least two inlet fluid reservoirs, at least two inlet channels, a spiral mixing channel, baffles and a buffer reservoir,
   wherein the inlet fluid reservoir is connected with a feeding tube on one end and an inlet channel on another end, and the other end of the inlet channel is connected with the spiral mixing channel; the inlet angle at the intersection between two inlet channels is α, which interchange at the spiral mixing channel;
   the baffles are set in interval arrangement at both sides of the spiral mixing channel wall, and they are arranged more intensively at entrance section than those at fully developed section; the angle between the baffle and the spiral mixing channel wall is β;
   the outlet end of the spiral mixing channel is connected with the buffer reservoir, and the sample in the buffer reservoir is collected through an outlet tube.

2. The passive spiral micro-mixer according to claim 1, wherein the micro-mixer is made of hydrophobic material.

3. The passive spiral micro-mixer according to claim 1, wherein the inlet angle at the intersection between two inlet channels α is 60°-300°.

4. The passive spiral micro-mixer according to claim 1, wherein the micro-mixer has spiral geometry, wherein the radius of inner circle is 1-3 cm while the radius of outer circle is 6-8 cm; cylinder number is 3-10; the cross-section of the spiral mixing channel is rectangular; the width of the mixing channel is 0.8-1 mm; and the ratio of width to depth is 1/10.

5. The passive spiral micro-mixer according to claim 1, wherein the baffles in the micro-mixer are arranged more intensively at the entrance section than those at the fully developed section; at the entrance section, the baffles are arranged every 15° of the central angle, at fully developed section the baffles are arranged every 45° of the central angle, and the changes is in the step of 15°.

6. The passive spiral micro-mixer according to claim 1, wherein the height of baffles in the micro-mixer is identical with the depth of the mixing channel, and the length of the baffles is ⅓-½ of the channel width.

7. The passive spiral micro-mixer according to claim 1, wherein the baffles are leaning-forward when β<90°, leaning-backward when β>90°, and when β=90° vertical baffles are obtained.

8. A method of synthesis of barium sulfate particles in the passive spiral micro-mixer according to claim 1 comprises:
   $Na_2SO_4$ and $BaCl_2$ solutions at identical concentration ranging from 1 mol/L to 2.5 mol/L are fed into the micro-mixer at the same volumetric flow rate which ranges from 1 mL/min to 5 mL/min and mixed;
   the mixture collected from the outlet of the micro-mixer is firstly washed using ethanol and then dried at 100° C. for 24 hours, and give barium sulfate particles with $d_{43}$ ranging from 100 nm to 500 nm.

9. The passive spiral micro-mixer according to claim 2, wherein the hydrophobic material is polydimethylsiloxane or polymethyl methacrylate.

* * * * *